May 25, 1965 J. M. SLATEN ETAL 3,185,155

VEIN STRIPPER

Filed March 13, 1963

INVENTORS
JOHN M. SLATEN
AND CHRISTOPHER L. WAAL
BY Christopher L. Waal
ATTORNEY

United States Patent Office 3,185,155
Patented May 25, 1965

3,185,155
VEIN STRIPPER
John M. Slaten and Christopher L. Waal, Milwaukee,
Wis.; said Waal assignor to said Slaten, Milwaukee, Wis.
Filed Mar. 13, 1963, Ser. No. 264,815
3 Claims. (Cl. 128—303)

This invention relates to surgical instruments and more particularly to vein strippers adapted for surgically removing varicose veins.

A type of vein stripper has heretofore been devised in which a stripping head is detachably mounted on a flexible tip-carrying shaft or cable, one form of such vein stripper being disclosed in United States Patent No. 3,045,676, issued July 24, 1962, to John M. Slaten, one of the present applicants.

An object of the invention is to provide an improved vein stripper of this general type which is equipped with a detachable one-piece stripping head of simple, durable and inexpensive construction and of such character as to facilitate handling and mounting of the head and to expedite cleaning.

Another object is to provide a vein stripper in which the detachable stripping head will be properly retained on the flexible shaft or cable when placed in service.

The invention further consists in the several features hereinafter described and claimed.

In the accompanying drawing, illustrating certain embodiments of the invention,

Figure 1:
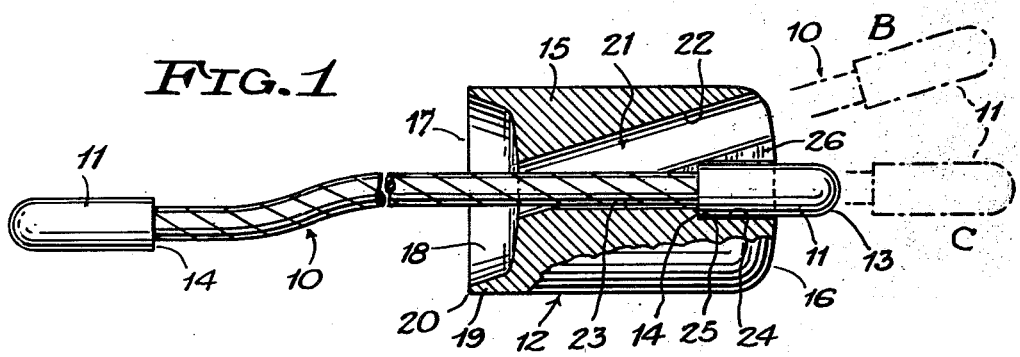
FIG. 1 is a side view, on an enlarged scale, of a vein stripper constructed in accordance with the invention, parts of a traction cable thereof being broken away, a stripping head of the device being shown in longitudinal section, and passing positions of a tip-carrying end of the cable with respect to the stripping head being shown in broken lines.

In the drawing, 10 designates a flexible traction shaft or cable having tips 11 permanently attached to the opposite ends thereof, as by brazing, and 12 designates generally a stripping head which is detachably mounted on either end of the cable.

The flexible tip-carrying cable 10, which is about three feet in length, is of the general type disclosed in the above-mentioned Slaten Patent 3,045,676, and is desirably formed of stainless steel wire. Each cable tip 11, which is desirably formed of stainless steel, is of cylindrical shape and has a rounded outer end 13. Each tip is slightly larger in diameter than the cable, and the inner end of each tip presents a narrow annular shoulder 14 about the cable. Either of the tip-carrying ends of the cable may be entered or introduced into a vein.

The stripping head 12 is detachably mounted on either end of the cable and comprises a one-piece head member or body 15 of generally cylindrical shape and desirably formed of stainless steel, the diameter of the head member being substantially larger than the cable tips. The head member has a rounded rear end 16, and the front end 17 is cupped to form a recess 18 bounded by a continuous peripheral rib or lip 19 which presents a vein-stripping edge 20.

Figure 2:
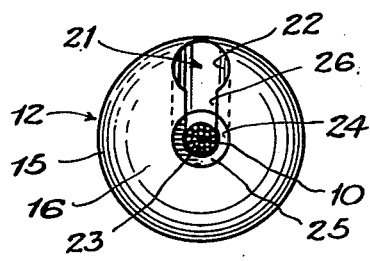
FIG. 2 is a rear end view of the stripping head on an enlarged scale, the cable being shown in section.
Figure 3:
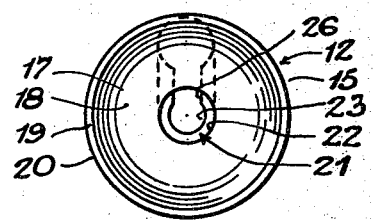
FIG. 3 is an enlarged front end view of the stripping head, the cable being omitted.

A passage 21 extends longitudinally through the head member and includes a cylindrical cable-introducing bore 22 slightly larger in diameter than the cable tips so as to permit insertion and removal of the cable. The bore 22 is inclined with respect to the longitudinal axis of the head and has its front end approximately centered with respect to the head axis. The rear end of the inclined bore 22 is radially offset with respect to the head axis and opens at the rounded rear end 16 of the head. The passage 21 also includes a central bore 23 which is slightly larger in diameter than the cable, the front end of this bore intersecting the inclined bore 22, and the rear end of the bore 23 communicating with a coaxial larger-diameter socket-forming bore 24 opening centrally at the rear end of the head. The socket-forming bore 24, which constitutes a tip-receiving socket, is slightly larger in diameter than the cable tip diameter and its inner end forms a rearwardly facing U-shaped or C-shaped shoulder 25 engageable by the annular tip shoulder 14 when the head is mounted on the cable. The diameter of the inclined cable-introducing bore 22 is approximately the same as the diameter of the socket-forming bore 24. The passage 21 further includes a parallel-sided radial slot 26 which intersects the bores 22, 23 and 24 and provides communication between the inclined bore 22 and the central bores 23 and 24, the rear end of the passage 21 presenting a dumb-bell shape, as seen in FIG. 2. The width of the radial slot 26 is the same as the diameter of the cable, or very slightly smaller, so that the cable, which may be laterally compressible, will have a light frictional engagement with the confronting walls of the slot when the cable is laterally shifted or transferred to its central position in the head member, thus preventing accidental separation of the cable and head member during assembly. After the cable tip is seated in the socket-forming bore 24, as seen in FIG. 1, it will be laterally confined in its central position in the head member. The central bore 23, which is open to the inclined bore 22 and the radial slot 26, forms a cable-receiving groove laterally confining the cable after the vein stripper is assembled, and the centrally located front end of the inclined bore 22 limits relative lateral displacement of the cable.

Figure 4:
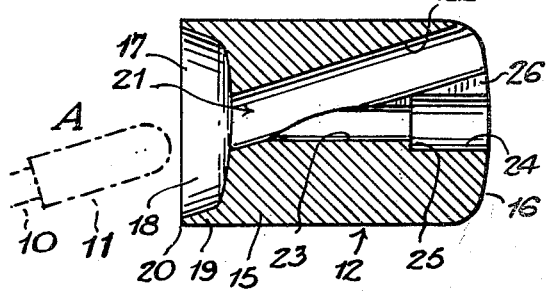
FIG. 4 is an enlarged longitudinal sectional view of the stripping head with the cable removed, a tip-carrying end of the cable being shown in broken lines in readiness to be applied to the head.
Figure 5:
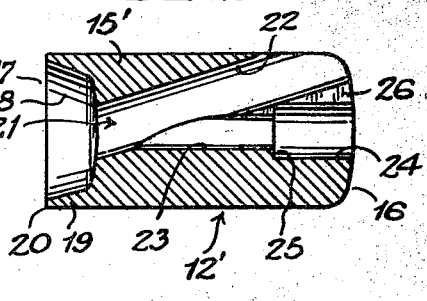
FIG. 5 is an enlarged longitudinal sectional view of a similar stripping head of smaller diameter for use with the same cable.
Figure 6:
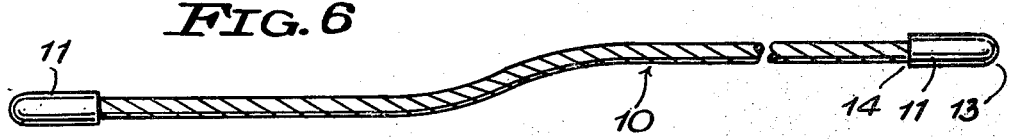
FIG. 6 is an enlarged side view of the flexible shaft or cable, parts being broken away.

The slightly modified form of stripping head 12' shown in FIG. 5 includes a longitudinally apertured head member 15' which is of smaller diameter than that of FIG. 4, but is otherwise similar and is used with the same traction cable.

In the use of the vein stripper, either end of the tipped cable 10 is passed through an incision in a varicose vein in the usual manner and thence outwardly through another incision in the vein, these incisions being at opposite ends of the portion of the vein to be removed. After insertion of the cable, both ends of the cable are in exposed position. The one-piece stripping head 12 is then applied to either end of the cable. In this manipulation, the projecting tip-carrying cable end is admitted through the inclined bore 22 of the head member from position A of FIG. 4 to position B of FIG. 1. The cable end is then laterally and angularly pushed through the radial slot 26 of the head member to position C of FIG. 1. During this latter relative displacement of the cable end with respect to the stripping head, the cable has a frictional engagement with the opposite walls of the slot 26 so as to prevent subsequent accidental separation of the stripping head from the cable. Finally, the cable tip 11 is axially seated in the socket-forming bore 24 of the head member, as shown by full lines in FIG. 1. With the head member thus assembled on the cable, the head member is disposed in coaxial position on the cable and is confined against relative lateral displacement. Traction is then applied to the head-carrying cable to strip the vein, the exposed circular stripping edge 20 of the head member engaging the vein to remove it from the surrounding tissue, and the stripped vein accumulating in a more or less corrugated condition in the cup-like recess 18 in the front end of the head. During this operation the stripping head is firmly held on the cable.

After the operation, the stripping head is easily removed from the cable by axially disengaging the cable tip from the socket-forming bore 24 to position C of FIG. 1, then laterally and angularly shifting the cable end to position B of FIG. 1, and finally withdrawing the tipped cable end through the inclined bore 22 of the head to position A of FIG. 4. The stripped vein is removed from the cable. The cable and head member can be readily cleaned and sterilized for subsequent use.

The one-piece stripping head permits simple and inexpensive manufacture, facilitates handling and mounting, expedites cleaning, and avoids the need for detachably fitting together small parts which are likely to become lost or mislaid.

We claim:

1. In a vein stripper having a stripping head for detachable mounting on a flexible traction cable with an enlarged tip representing an annular shoulder at its inner end, said stripping head comprising a one-piece head member having a generally circular front end presenting a continuous peripheral stripping edge, said head member having a passage extending longitudinally therethrough, said passage including a cable-receiving groove extending along the axial region of the head member and communicating at its rear end with an axially disposed tip-receiving socket-forming bore opening at the rear end of said member, said socket-forming bore having a rearwardly facing shoulder at its front end engageable by the annular cable tip shoulder, said passage also including an inclined cable-introducing bore adapted to admit the tip-carrying cable therethrough from the front end of said head member, the diameter of said inclined bore being as large as the diameter of the socket-forming bore, the open front end of said inclined bore being disposed approximately centrally of said head member, and the open rear end of said inclined bore being radially offset from the open rear end of said socket-forming bore, the front end of said cable-receiving groove intersecting the front portion of said inclined bore, and said passage further including a radial cable-admitting slot connecting said inclined bore with said groove and socket-forming bore, the width of said cable-receiving groove and slot being smaller than the diameter of said inclined bore and said socket-forming bore.

2. In a vein stripper having a stripping head for detachable mounting on a flexible traction cable with an enlarged tip presenting an annular shoulder at its inner end, said stripping member comprising a one-piece head member having a generally circular front end presenting a continuous peripheral stripping edge, said head member having a passage extending longitudinally therethrough, said passage including an axially disposed cable-receiving groove communicating with a rearwardly opening aligned tip-receiving socket-forming bore at its rear end, said socket-forming bore having a rearwardly facing shoulder at its front end engageable by the annular cable tip shoulder, said passage also including a cable introducing bore opening at the front and rear ends of said head member and adapted to admit the tip-carrying cable therethrough from the front end of said head member, the open rear end of said cable-introducing bore being radially offset from the open rear end of said socket-forming bore, and said passage further including a radial cable-admitting slot connecting said cable-introducing bore and said cable-receiving groove and socket-forming bore, the width of said cable-receiving groove and slot being smaller than the diameter of said cable-introducing bore and said socket-forming bore, and the diameter of said two last-named bores being approximately equal.

3. In a vein stripper having a stripping head for detachable mounting on a flexible traction cable with an enlarged tip presenting an annular shoulder at its inner end, said stripping head comprising a one-piece head member having a generally circular front end presenting a continuous peripheral stripping edge, said head member having a passage extending longitudinally therethrough, said passage including an axially disposed cable-receiving groove with a rearwardly opening tip-receiving socket-forming bore at its rear end, said socket-forming bore having a rearwardly facing shoulder at its front end engageable by the annular cable tip shoulder, said passage also including an inclined bore adapted to admit the tip-carrying cable therethrough from the front end of said head member, the open front end of said inclined bore being disposed approximately centrally of said head member, and the open rear end of said inclined bore being radially offset from the open rear end of said socket-forming bore, said passage further including a radial cable-admitting slot connecting said inclined bore and said groove and socket-forming bore, the width of said cable-receiving groove being smaller than the diameter of said inclined bore and socket-forming bore, and the width of said slot being smaller than the width of said cable-receiving groove, the walls of said slot being adapted to impose a frictional restraint on the cable during transfer of the cable between said inclined bore and said cable-receiving groove.

References Cited by the Examiner

UNITED STATES PATENTS

| 2,779,334 | 1/57 | Sandborn | 128—303 |
| 2,868,206 | 1/59 | Stoesser | 128—303 |
| 3,045,676 | 7/62 | Slaten | 128—303 |

RICHARD A. GAUDET, *Primary Examiner.*